United States Patent [19]

Jarvis et al.

[11] Patent Number: 5,665,143

[45] Date of Patent: Sep. 9, 1997

[54] AIR FILTRATION SYSTEM

[75] Inventors: Allan Jarvis; Richard J. Holmes, both of Salisbury, Great Britain

[73] Assignee: The Secretary of State of Defence In Her Britannic Majesty's Government of the United Kingdom of Great Britain and Northern Ireland, Whitehall, England

[21] Appl. No.: 591,676

[22] PCT Filed: Aug. 4, 1994

[86] PCT No.: PCT/GB94/01714

§ 371 Date: Feb. 16, 1996

§ 102(e) Date: Feb. 16, 1996

[87] PCT Pub. No.: WO95/05886

PCT Pub. Date: Mar. 2, 1995

[30] Foreign Application Priority Data

Aug. 20, 1993 [GB] United Kingdom ............... 9317325

[51] Int. Cl.[6] ............................................. B01D 53/047
[52] U.S. Cl. ........................... 95/96; 95/130; 96/130; 96/133
[58] Field of Search .................. 95/96–106, 130; 96/108, 121, 122, 126–128, 130, 133

[56] References Cited

U.S. PATENT DOCUMENTS

| 3,263,400 | 8/1966 | Hoke et al. | 96/130 X |
|---|---|---|---|
| 3,922,149 | 11/1975 | Ruder et al. | 95/130 X |
| 4,231,768 | 11/1980 | Seibert et al. | 96/128 |
| 4,530,817 | 7/1985 | Hölter et al. | 96/130 X |
| 4,732,579 | 3/1988 | Veltman et al. | 96/130 X |
| 4,793,832 | 12/1988 | Veltman et al. | 96/128 X |
| 4,983,190 | 1/1991 | Verrando et al. | 96/130 X |
| 5,298,054 | 3/1994 | Malik | 96/133 X |

FOREIGN PATENT DOCUMENTS

| 2 238 490 | 6/1991 | United Kingdom . |
|---|---|---|
| WO92-05859 | 4/1992 | WIPO . |

*Primary Examiner*—Robert Spitzer
*Attorney, Agent, or Firm*—Nixon & Vanderhye P.C.

[57] ABSTRACT

A composite gas filtration system for removal of toxic or harmful agents from a breathable gas supply, wherein a compressor fed pressure swing adsorption unit is placed upstream of an adsorbent carbon filter unit in a gas supply line, characterized in that a plenum chamber is positioned in the gas supply line with one or more inlet orifices supplied by gas treated by the pressure swing adsorption unit, one or more exit orifices leading to the carbon filter unit, and one or more further inlet orifices supplied by gas from upstream of the pressure swing adsorption unit, wherein a device for drawing or propelling breathable gas through the plenum chamber and carbon filter from the further inlet orifices in the event of shut down of the pressure swing adsorption unit and/or compressor is provided. By use of the preferred system of the present invention it is thus possible to operate a high pressure swing adsorption unit in conjunction with an adsorbent carbon filter unit, that not being high pressure type, whereby in event of the high pressure units failing the system automatically switches to a back-up mode not requiring redundant units that would be required in prior art systems.

24 Claims, 1 Drawing Sheet

AIR FILTRATION SYSTEM

BACKGROUND OF THE INVENTION

1. Field of the Invention

The present invention relates to improved fluid filtration systems, particularly air filtration systems for supply of air to a work station or living quarters area where human or animal operatives are reliant upon air passing through the system, at least during times when toxic or harmful agents are present outside that area. The invention particularly provides a land vehicle, aircraft, water vessel or building ventilation system which is designed for operation in a toxic vapour or gas containing environment, such as might occur during armed conflict where chemical/biological warfare agents are deployed.

2. Discussion of Prior Art

It is known to remove contaminating agents from gases by use of low pressure activated carbon filter bed units, including those that have been impregnated with agents that increase sorption capacity for particular agents. These however are known to be limited in use when applied to systems for supplying air to an entire living area, as opposed to an individual, as they require frequent replacement due to limitations on service life, with resultant regimes of replacement at regular intervals needed if problems are to be avoided. Replacement filter canisters for individual masks take relatively little effort to fit, but filter replacement in a building or a vehicle provides a significant logistics problem. Furthermore, activated carbons are known to age even in the absence of active flow through them through action of moisture and heat, particulates cause damage and blockage, and exhaust fumes may poison the beds prior to intended use.

In order to avoid these problems other types of filter have been developed for removal of contaminants in air supplied in 'collective protection' scenarios, particularly using pressure swing adsorption (PSA) technology. In GB 2238490 there is described a molecular sieve PSA unit for use in such applications whereby a full regenerative capability is provided by a compact unit allowing almost continuous energy efficient and reliable operation. This unit places an aerosol filter upstream and a particulate filter downstream of the molecular sieve beds. The document specifies that the PSA adsorber is included in lieu of an activated carbon or impregnated carbon filter. The use of a HEPA grade coalescing filter as upstream filter and a super-fine HEPA dust filter as downstream filter are recommended in order to achieve synergistic effect, with the result that the entire unit may be made compact.

This document further states that for added protection a high-pressure impregnated carbon filter may be placed downstream of the PSA unit, with a chemical agent vapour detector provided between the two to indicate when breakthrough had been achieved. However, this unit works on the basis of high pressure, and in the event that the compressor unit should fail, complete system failure will follow and the users will no longer be protected.

In the event of failure GB 2238490 prescribes 'positive system shutdown' with NBC protection being switched to 'an auxiliary system'. The nature of this auxiliary system is not suggested, but in any case is an otherwise redundant spare unit. The lack of back-up inbuilt into the main unit thus further requires a system for determining system failure, and initiation of the operation of the spare unit.

SUMMARY OF THE INVENTION

The present inventors have now provided a composite gas filtration system for removal of toxic or harmful agents from a breathable gas supply, wherein a compressor fed pressure swing adsorption unit is placed upstream of an adsorbent carbon filter unit in a gas supply line, characterised in that a plenum chamber is positioned in the gas supply line with one or more inlet orifices supplied by gas treated by the pressure swing adsorption unit, one or more exit orifices leading to the carbon filter unit, and one or more further inlet orifices supplied by gas from upstream of the pressure swing adsorption unit, wherein a means for drawing or propelling breathable gas through the plenum chamber and carbon filter from the further inlet orifices in the event of shut down of the pressure swing adsorption unit and/or compressor is provided.

Preferably the inlet orifice or orifices supplied by gas from the pressure swing adsorption unit are provided with valve means that operates to close each orifice in the event that gas flow from that unit is reduced or stopped, eg. when pressure in the line from that unit falls below a set value due to, eg. compressor failure, blockage or positive shut down. Conveniently such valve means is provided by one or more closure elements that are biased to move into engagement with the orifice or orifices in the absence of a set pressure from the unit. Such element is conveniently a non-return valve, or is a sprung plate dimensioned such as to seal the respective orifice on moving to the closed position, pivoting about a mounting point to one side of that orifice.

The means for drawing or propelling breathable gas through the plenum chamber and carbon filter from the further orifices in the event of shut down of the pressure swing adsorbent and/or compressor is conveniently provided by a pump unit, preferably a fan unit, positioned upstream of the compressor or downstream of the carbon filter. Preferably a fan is provided between the carbon filter and the area in which the humans or animals are to be located in use.

Preferably a valve means is provided for ensuring that the supply of gas into the plenum chamber from the further inlet orifices is restricted, preferably shut off completely, when the pressure swing adsorption unit is operating, and this is conveniently in the form of one or more closure elements biased to move into engagement with the further orifice or orifices in the event that pressure in the plenum chamber exceeds a set value. Again these are conveniently in the form of non-return valve or a sprung plate dimensioned such as to seal the respective orifice on moving to the closed position, pivoting about a mounting point to one side of that orifice.

Thus should the pressure in the supply line from the pressure swing adsorption unit fall below the set level, the valve means on the inlet orifices suppling gas from that unit will close them, causing a corresponding reduction of pressure in the plenum chamber. Once the pressure in the chamber reaches a set lower value the valve means will no longer close the further inlet orifices and the means for drawing or propelling the breathable gas through the plenum chamber via the further inlet orifices will cause a flow direct from the upstream side of the pressure swing adsorption unit, preferably of its compressor, through the carbon filter unit to the human or animal area.

Preferably the operation of a fan downstream of the carbon filter unit will draw gas from the plenum chamber, thus reducing the pressure therein due to the cessation of supply from the pressure swing adsorption unit, and this will open the valve means on the further inlet orifice or orifices. Use of a non-return valve, sprung plate or plate operating under pressure influences alone results in the opening of the orifices with relatively small negative pressure.

It is particularly preferred that the breathable gas drawn or propelled through the further inlet orifices in this way comes from upstream of the compressor, such that this might be of the type that when not operating acts as a substantially gas tight seal. Most preferably the breathable gas is drawn or propelled from a position downstream of a prefilter unit and/or cyclone unit such that any particulates and/or droplets are already removed.

Where the complete system is being deployed in a vehicle, eg. such as a tank, armoured car or armoured personnel carrier, the compressor is conveniently driven by the vehicle motor unit, and thus is conveniently a hydrovane type pump end of chain or gear driven type. In order that high speed operation of the motor in combination with other factors should not cause damage to the system, a pressure relief valve is preferably provided connected to the system, conveniently on an outlet from the plenum chamber.

By use of the preferred system of the present invention it is thus possible to operate a high pressure pressure swing adsorption unit in conjunction with an adsorbent carbon filter unit, that not being of high pressure type, whereby in event of the high pressure units failing the system automatically switches to a back-up mode, without the need for electronic components if sprung plates or similar mechanical valve means are used; said back-up mode not requiring redundant units that would be required in prior art systems. In normal operation (ie. PSA unit on) the system would not impose any significant increase in electrical load as the compressor would be driven via the main engine, only 15 W would be required to run the valve sequencing system on the PSA unit and the fan is already accounted for in the power budget on a vehicle.

Silent watch operation for a vehicle mounted system is another important and potentially critical consideration in design. The present system is designed so that when the main engine is shut down and the PSA unit therefore ceases to operate, the fan will continue to operate in the same manner as current vehicle NBC packs, ie. ambient air will be drawn via the bypass without the need for crew intervention. This means that the vehicle can comply fully with current silent watch modes of operation, being as quiet as current NBC packs with no additional power requirement.

Furthermore, because the pressure swing adsorption unit would effectively dry the air fed to the plenum chamber, the carbon unit would be spared the ageing effects of humid air and thus would be in a condition to function efficiently on its own. The absence of water vapour would also result in substantial enhancement of in service life with the consequence that logistics burden would be reduced and user confidence enhanced. At the same time the system of the invention harnesses the advantages of the regenerability of the pressure swing adsorption unit while avoiding its inherent disadvantage of lack of function in the event of compressor failure.

Clearly during silent watch the filter will adsorb water. However silent watch periods do not normally exceed 10 hours due to battery life and other operational constraints. During this time if the filter has been run in dry air feedstock for the bulk of its in-service life then it will behave as a fresh filter, giving maximum protection. At the end of the silent watch period the main engine will be started up and the dry air will again feed the filter. This results in the desorption of water adsorbed during silent watch, which re-frees up the carbon pore structure to provide maximum agent adsorption capacity and stops any ageing taking place.

It is known that ageing only becomes important if the filter has been stored or used in humid air for a period of many days or weeks; ageing will not take place during exposure to humid air during a period of silent watch of 10 to 20 hours. The inventors have determined that during an 80 day run with the PSA unit on-line exposure to humid air for 28 hours continuously at full flow (100 cfm) resulted in no significant change compared to a standard sample which has been stored dry and sealed. The implication of this result is that the system could be used for many silent watch periods and so long as the filter is fed dry air after completing silent watch, ageing will be minimal. The other advantage of this design is that should the PSA or compressor fail the filter will offer a long period of protection before changing is required according to standing operational procedures because it will then behave as a fresh filter. Thus this illustrates the ability of the present system to provide for both silent watch and failure modes with respective advantages.

A still further advantage of the present invention is that while avoiding redundancy of the back-up system, it still allows its individual components to be placed in separate parts of the vehicle or installation in which it is situated. Thus if the high pressure part of the system is damaged by an accident or hostile action, the low pressure part of the system need not be so integrated with it such that it inevitably would also be damaged. These advantages carry over if such system is deployed in aircraft, ships or buildings.

BRIEF DESCRIPTION OF THE DRAWINGS

The apparatus of the present invention will now be described by way of illustration only by reference to the following Example. Further embodiments falling within the scope of the claims attached hereto will occur to those skilled in the art in the light of this.

FIGURE

Figure 1:
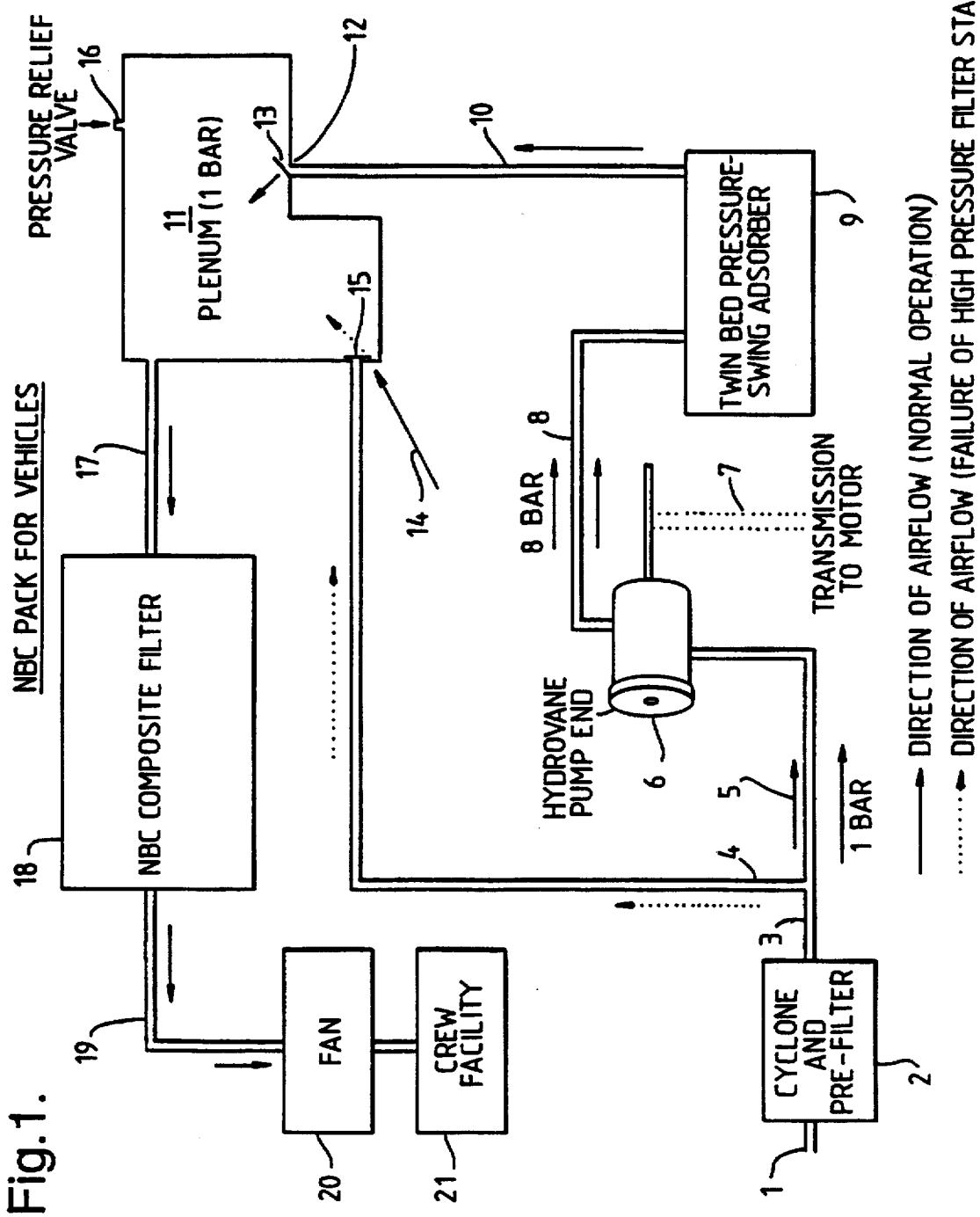

FIG. 1 is a diagrammatic representation of a composite gas filtration unit of the present invention.

DETAILED DISCUSSION OF PREFERRED EMBODIMENTS

EXAMPLE 1

Apparatus of the Invention

A composite gas filtration system as shown in FIG. 1 is provided with an inlet (1) feeding a cyclone and prefilter unit (2) with an outlet conduit from that (3) which branches downstream into two branch conduits (4) and (5).

Conduit (5) feeds a high pressure leg of the system which is accessed through a compressor in the form of a hydrovane pump end (6) driven by a motor transmission chain (7) to output air at approximately eight atmospheres via a conduit (8) which in turn feeds a twin bed pressure swing adsorption unit (9). The pump end is driven by an auxiliary power unit in preferred versions such that the system is operable when the motor is not operational; its dimensions being approximately 70 cm long and 40 cm diameter such as to provide a flow of at least about 100 cubic feet minute$^{-1}$.

The adsorption unit (9) uses a mesoporous carbon layer at the influent end, a molecular sieve 3A layer, a microporous carbon layer nearest the effluent end and includes elements required for heat or heatless regeneration of its beds. Mesoporous carbon may be used alone. Inlet filters (not shown) are attached to this unit and are provided with autodrain facilities for removal of the bulk of condensed water and some of the higher boiling point components (oil vapours).

The dry air feedstock then passes through a hopcalite filter, for protection against penetrating agent, and a fine dust filter (neither shown).

An outlet conduit (10) takes treated air from the unit (9) and feeds it into a plenum chamber (11) via an inlet orifice (12); the air depressurising to one atmosphere during passage through (10) into (11). Orifice (12) has a sprung plate (13) acting across it which is biased to close the orifice when pressure in conduit (10) falls below a set value below eight atmospheres, eg. four atmospheres, but above atmospheric pressure. The plenum chamber (11) is gas tight.

Conduit (4) feeds the plenum chamber directly via an orifice (14) across which acts a sprung plate (15) which is biased to close the orifice when the pressure in the plenum chamber is at atmospheric pressure. The plenum chamber has a pressure relief valve (16) which prevents pressure rising above a set operational overpressure, eg. a few millibars over bar. Conduit (17) feeds gas from the plenum chamber to a low pressure NBC composite adsorbent carbon filter unit (18) under influence of fan unit (20) positioned downstream on conduit (19), before entering an area (21) where humans or animals are positioned.

In operation the plenum overpressure is controlled on the balance of the flows passed into and out from the plenum chamber by the pressure swing adsorption unit (9) and the fan unit (19). In the event that the compressor (6) or adsorption unit (9) failed the sprung plate (13) automatically closes, and the negative pressure created in the plenum by the fan unit (20) causes sprung plate (15) to open as opposed to being closed by the normally prevailing overpressure. Air would then be drawn automatically from the cyclone and pre-filter unit without the need for human or electronic intervention. A warning indicator is however included for alerting the crew that the adsorbent carbon filter unit is online without the protection of the PSA unit, and thus that it will now start to degrade.

EXAMPLE 2

Method of Operating the Apparatus of the Invention

An apparatus as set out in Example 1 was used modified in that it houses the NBC composite filter (18) within the plenum chamber such that air must pass through filter (18) to reach line (19) and the fan (20). The high pressure lee of the system fed by lines (5) and (8) includes a coalescer (Domnick Hunter), pressure swing absorber drier bed (Domnick Hunter Pneudri) containing molecular sieve desiccant, and a dust filter upstream of line (10). Volumes of the various units are as follows: compressor 0.2 $m^3$; coalescer 0.006 $m^3$, pressure swing absorber drier 0.2 $m^3$, dust filter 0.006 $m^3$, plenum chamber 0.01 $m^3$ and fan 0.023 $m^3$; pipework is of diameter 2.8 cm. The cyclone and prefilter dimensions and volume are standard components. The coalescer is provided to separate bulk condensate after compression and the dust filter is required to prevent desiccant reaching the NBC ASCT carbon composite filter.

NB: On vehicles the drier and coalescer are sited close together away from the compressor such as to allow air cooling to take place; thus giving ability to separate components locally from a remote location.

Experimental: Two runs were carried out: run (1) with the PSA drier in line providing dry air to the filter and run (2) without the drier thus providing wet air. Each run was for 80 days continuous operation (ca. 2000 hrs) and controlled relative humidity (RH) and temperature (T) air was fed to the system during this time via the inlet to the compressor (run 1) or direct to the filter (run 2). The RH exposure regime of Table 1 was employed for both runs 1 and 2.

During each run none of the principle items failed and there was no need for any drier or compressor maintenance. The PSA drier operated in a reliable fashion and the output air was of consistent quality with respect to flow rate (180 $m^3$/hour) and dewpoint. The dewpoint of the air entering the carbon filter was typically $-45°$ C. to $-60°$ C. and was dependent upon inlet air temperature. During run 1 a simulation of the system running in bypass mode (silent watch mode or failure mode) was made consisting of running the filter in high RH air for one day (24 hours).

TABLE 1

| RH of air (%) | Temp of air (°C.) | Duration (days continuous) |
|---|---|---|
| 80 | 22 | 12 |
| 80 | 25 | 14 |
| 90 | 25 | 14 |
| 90 | 30 | 14 |
| 60 | 30 | 14 |
| 60 | 22 | 12 |

At the end of each run the filters were inspected and carbon was removed from each filter to determine its condition, ie. extent of degredation due to in-service ageing and the adsorption of any environmental contaminants. A number of chemical warfare agents were employed to evaluate the state of the carbon, including chloropicrin (PS), hydrogen cyanide (AC) and cyanogen chloride (CK). The control sample was taken from the same drum used to fill the filters used in these measurements but was kept dry, sealed and shielded from light until required for use. Nitrogen adsorption was used to determine surface area values for the samples removed from the filters. Results are given below.

AC test conditions were as follows: 12,500 mg $cm^3$ AC concentration was used until breakthrough at RH 80% and at 22° C. after equilibrating each sample in RH80% air at 22° C. before beginning the test. Tests were carried out using filters with an airflow at a linear flow velocity of 318 cm $min^{-1}$. Figures for CY breakthrough are given as this is a breakdown product of AC on impregnated carbon and penetrates the filter first; filter life depends primarily on CY breakthrough. Commas separate results from repeat determinations in Table 2.

TABLE 2

| Sample: | Breakthrough time in minutes for AC and CY: | |
|---|---|---|
| Control | AC 41.41.39 | CY 33.30.32 |
| Run 1 | 41.38.45 | 30.33.36 |
| Run 2 | 32.31.32.29 | 19.22.21.23 |

CK test conditions were as follows: 4000 mg $m^{-3}$ CK concentration to breakthrough after equilibrating at RH 80% and 22° C. before beginning each test. Tests were carried out using filters with at a linear flow velocity of 350 cm $min^{-1}$. Results are given in Table 3.

TABLE 3

| Sample: | Breakthrough time in minutes for CK: |
|---|---|
| Control | CK 90.94 |
| Run 1 | 87.92.84.85 |
| Run 2 | 39.59.47.48.60 |

PS test conditions were as follows: 4000 mg $m^{-3}$ PS concentration to breakthrough at RH 80% and 22° C. after equilibrating each sample in RH 80% air at 22° C. before beginning each test. Tests were carried out using filters with an airflow at a linear flow velocity of 350 cm min$^{-1}$. Results are given in Table 4.

TABLE 4

| Sample: | Breakthrough time in minutes for PS: |
|---|---|
| Control | PS 35.38 |
| Run 1 | 31.31.32.32 |
| Run 2 | 16.14.14.12 |

Bed surface area after each run was also determined: Results being provided in Table 5.

TABLE 5

| Sample | Nitrogen Surface Area (BET m$^2$ g$^{-1}$) |
|---|---|
| Control | 856 |
| Run 1 | 874.850.856 |
| Run 2 | 925.899.878 |

Measurements were made at −196° C. using standard volumetric method; typical error on measurement of control ±20 (BET m$^2$g$^{-1}$).

Summary of RUN1:

For each agent little or no losses in protection were observed. This demonstrates that running a filter in dry air for an extended period will not degrade the carbon surface or the impregnants significantly. It should also be noted that use of the 24 hour exposure at full flow to the high humidity airflow did not cause any significant carbon degredation, illustrating that silent watch mode function efficiently; many such watch periods thus could be employed. As long as the filter is run in dry air after each watch before shutting the NBC pack down with the main engine. The small changes in gas protection observed at the end of run 1 are typically within the limits of accuracy of the experimental methods. Changes are shown below with respect to control values in Table 6:

TABLE 6

| | Run 1 |
|---|---|
| Agent | Change |
| AC | No change |
| CK | Loss of 5% protection (±2–3%). |
| PS | Loss of 10% protection (±5%). |

Some small variation on absolute gas performance due to variability of the carbon can also contribute to any observed differences; thus no significant changes are evident. Nitrogen absorption values indicated that no significant structural changes resulted from using the carbon in dry air, ie. measurements were within experimental limits compared to the control carbon.

Because of the nature of the interaction between AC and the filter, slightly humid conditions are preferred for its exclusion. Using the present dry air system resulted in fully acceptable protection against AC, and furthermore, the breakthrough time, unlike that with humid air, can be predicted (see Table 7). Furthermore, by selection of appropriate PSA desiccant substrate, a person skilled in the art will be able to increase system capability to sustain more attacks.

Studies of hydrogen cyanide penetration as a function of dewpoint of air were undertaken on the low pressure leg of the system alone, with test conditions as for AC above except for the dewpoint of the challenge and equilibration airstream. Results are shown as the Ct or dosage of AC (ie. a function of the CY breakthrough time) against which the filter protects. These of course would be much improved when the PSA unit is operating.

Dewpoints of below −60° C. to +19° C. were studied with results being set out in Table 7 below.

TABLE 7

| Dewpoint | Degree of protection (Ct mg min$^{-1}$ m$^{-3}$) |
|---|---|
| <−60° C. | 90000 |
| −2° C. | 100000 |
| +2° C. | 115000 |
| +19° C. | 175000 |

Summary of RUN2:

For each agent significant losses of protection were observed. The minimum loss in protection for gases employed for which data is not shown was usually above 30%. Losses in protection were observed for both physically adsorbed (PS) and chemically adsorbed (AC,CK) agents; degradation of performance for each agent as compared to control is set out in Table 8 below

TABLE 8

| Agent | Change |
|---|---|
| AC: | Loss of 33% protection. |
| CK: | Loss of 45% protection (±2%) |
| PS: | Loss of 60% protection (±5%) |

Some variation on absolute performances due to the variability of the carbon can also contribute to any observed differences, but the differences found here are substantial, particularly as filters in practice run for longer than 80 days. Nitrogen adsorption indicated that some structural changes resulted from using the filter in high humidity air, ie. two of the measurements were outside experimental limits when compared to the control carbon. The increase in surface area is most likely due to the loss of some impregnant due to migration/dissolution when the bed was in contact with air saturated with water vapour.

In addition to reduced efficacy with respect to adsorption of toxic agents, the filter housing itself was found to be affected by the humid air. The retaining scrim was rusted and in time rust penetration would destroy the integrity of the filter and allow direct leakage of agent. Corrosive effects occur with high RH air due to condensation of water vapour in the bed and is unavoidable when the filter is used eg. during a warm afternoon and then into the evening when the ambient air temperature drops and the RH reaches 100% on the filter. Periods just after dawn, or when mist prevails, are other examples when the air entering the filter will be at or close to saturation. In addition to corrosive effects the reductions in protection afforded by carbon filters, fresh and aged, at very high humidities are known to be significant. For some agents dry filters significantly outperform wet filters and it is also a probability that dissolution of impregnants may take place during use in air saturated with water vapour; this effect may contribute to loss of protection. Thus it is clear that use of the PS drier/low pressure filter combination protects against corrosive damage and dissolution and migration of impregnants also.

We claim:

1. A method of providing breathable air to a human or animal living area comprising passing air through a composite gas filtration system comprising a compressor fee pressure swing adsorption unit placed upstream of an adsorbent carbon filter unit in a gas supply line, characterised in that in the event of the pressure swing adsorption unit shutting down, air is automatically drawn or propelled from upstream of the compressor and pressure swing adsorption unit through the adsorbent carbon filter unit and passed to the living area.

2. A method as claimed in claim 1 wherein in the event of the pressure swing adsorption unit shutting down a pump automatically draws or propels air through the adsorbent carbon filter at about atmospheric pressure.

3. A method as claimed in claim 2 wherein the pump draws or propels air through the adsorbent carbon filter with an overpressure of a few millibars above atmospheric pressure.

4. A composite gas filtration system comprising a compressor fed pressure swing adsorption unit placed upstream of an adsorbent carbon filter unit in a gas supply line, characterised in that a plenum chamber is positioned in the gas supply line with one or more inlet orifices supplied by gas treated by the pressure swing adsorption unit, one or more exit orifices leading to the carbon filter unit, end one or more further inlet orifices supplied by gas from upstream of the pressure swing adsorption unit, wherein a means for drawing or propelling gas through the plenum chamber end carbon filter from the further inlet orifices in the event of shut down of the pressure swing adsorption unit and/or compressor is provided.

5. A filtration system as claimed in claim 4 characterised in that it is suitable for treating a breathable gas for the purpose of removing agents that are toxic or harmful to humans or animals.

6. A filtration system as claimed in claim 4 wherein the inlet orifice or orifices supplied by gas from the pressure swing adsorption unit are provided with valve means that operates to close each orifice in the event that gas flow from the pressure swing absorption unit is reduced or stopped.

7. A filtration system as claimed in claim 6 characterised in that the valve means is provided by one or more closure elements that are biased to move into engagement with the orifice or orifices in the absence of a set pressure from the unit.

8. A filtration unit as claimed in claim 7 wherein the closure element is a non-return valve or a sprung plate which is dimensioned such as to seal the respective orifice on moving to the closed position and pivots about a mounting point to one side of that orifice.

9. A filtration unit as claimed in claim 4 wherein the means for drawing or propelling breathable gas through the plenum chamber and carbon filter from the further orifices in the event of shut down of the pressure swing adsorbent and/or compressor is a pump unit.

10. A filtration unit as claimed in claim 9 wherein the pump unit is a fan unit positioned upstream of the compressor or downstream of the carbon filter.

11. A filtration unit as claimed in claim 10 wherein the fan unit is provided between the carbon filter and the area in which humans or animals are to be located in use.

12. A filtration unit as claimed in claim 4 wherein a valve means is provided for ensuring that the supply of gas into the plenum chamber from the further inlet orifices is restricted when the pressure swing adsorption unit is operating.

13. A filtration unit as claimed in claim 12 wherein the valve means is in the form of one or more closure elements biased to move into engagement with the further orifice or orifices in the event that pressure in the plenum chamber exceeds a set value.

14. A filtration unit as claimed in claim 13 wherein each closure element is in the form of a non-return valve or a sprung plate which is dimensioned such as to seal the respective orifice on moving to the closed position, pivoting about a mounting point to one side of that orifice.

15. A filtration unit as claimed in claim 4 wherein the breathable gas drawn or propelled through the further inlet orifices comes from upstream of the compressor.

16. A filtration unit as claimed in claim 4 wherein the breathable gas is drawn or propelled from a position downstream of a prefilter unit and/or cyclone unit for removing particulates and/or droplets.

17. A filtration unit as claimed in claim 4 wherein the unit is deployed in a vehicle and the compressor is driven by the vehicle motor unit.

18. A filtration unit as claimed in claim 4 wherein the compressor is a hydrovane end type pump of chain or gear driven type.

19. A filtration unit as claimed in claim 4 wherein a pressure relief valve is provided on a further outlet from the plenum chamber.

20. A filtration unit as claimed in claim 4 wherein the means for drawing or propelling air through the plenum chamber and carbon filter operates such that the air is at about one atmosphere in each of these.

21. A fitration unit as claimed in claim 20 wherein the means for drawing or propelling air through the plenum chamber and carbon filter operates such as to produce an overpressure, downstream of the filter, with respect to the atmospheric pressure in a living space fed with the filtered gas.

22. A filtration unit as claimed in claim 21 wherein the overpressure is of the order of several millibar.

23. A filtration unit as claimed in claim 4 wherein the pressure swing adsorption unit operates at a pressure of 3 to 20 atmospheres.

24. A filtration unit as claimed in claim 23 wherein the pressure swing adsorption unit operates at a pressure of 5 to 7 atmospheres.

* * * * *